(12) United States Patent
Sattler et al.

(10) Patent No.: US 6,811,390 B1
(45) Date of Patent: Nov. 2, 2004

(54) ROTARY EXTRUSION-BLOW MOULDING MACHINE WITH TILTING MOULDS

(75) Inventors: Jean Sattler, Le Havre Cedex (FR); Philippe Derouault, Le Havre Cedex (FR)

(73) Assignee: Sidel, Le Havre Cedex (FR)

( * ) Notice: Subject to any disclaimer, the term of this patent is extended or adjusted under 35 U.S.C. 154(b) by 122 days.

(21) Appl. No.: 10/088,231

(22) PCT Filed: Sep. 12, 2000

(86) PCT No.: PCT/FR00/02504

§ 371 (c)(1),
(2), (4) Date: Apr. 1, 2002

(87) PCT Pub. No.: WO01/23165

PCT Pub. Date: Apr. 5, 2001

(30) Foreign Application Priority Data

Sep. 29, 1999 (FR) .............................. 99 12370

(51) Int. Cl.[7] .................... B29C 49/36; B29C 49/04
(52) U.S. Cl. .................. 425/532; 425/540; 425/541; 264/543
(58) Field of Search ................. 425/532, 540, 425/541; 264/543; B29C 49/36

(56) References Cited

U.S. PATENT DOCUMENTS

| | | | | |
|---|---|---|---|---|
| 2,674,006 A | * | 4/1954 | Bailey et al. ............... | 425/532 |
| RE25,290 E | * | 12/1962 | Parfrey ...................... | 425/532 |
| 3,334,379 A | * | 8/1967 | Di Settembrini ........... | 425/540 |
| 3,345,686 A | * | 10/1967 | Di Settembrini ........... | 425/532 |
| 3,496,600 A | * | 2/1970 | Heston ....................... | 425/540 |
| 3,579,621 A | * | 5/1971 | Mehnert ..................... | 264/543 |
| 3,594,861 A | * | 7/1971 | Fischer et al. ............. | 425/532 |
| 3,611,484 A | * | 10/1971 | Lecluyse et al. ........... | 425/540 |
| 3,718,724 A | * | 2/1973 | Holzmann et al. ......... | 264/543 |
| 3,941,542 A | * | 3/1976 | Uhlig .......................... | 425/530 |
| 4,195,053 A | * | 3/1980 | Lambarth ................... | 425/532 |
| 4,569,651 A | * | 2/1986 | Krall .......................... | 425/532 |
| 4,738,612 A | * | 4/1988 | Kikuchi et al. ............. | 425/532 |

FOREIGN PATENT DOCUMENTS

| | | | | |
|---|---|---|---|---|
| EP | 0 284 242 A2 | | 9/1988 | |
| EP | 464933 A2 | * | 1/1992 | ........... B29C/49/36 |

* cited by examiner

Primary Examiner—Robert B. Davis
(74) Attorney, Agent, or Firm—Sughrue Mion, PLLC

(57) ABSTRACT

An extrusion blow-molding machine, including several molding units borne by a carrousel rotating about a substantially vertical axis (A1), wherein each molding unit is mounted on the carrousel such that it can be tilted about a substantially horizontal axis (An).

9 Claims, 2 Drawing Sheets

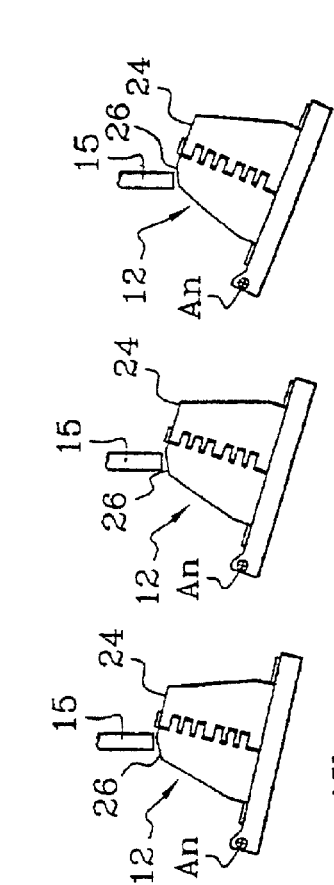
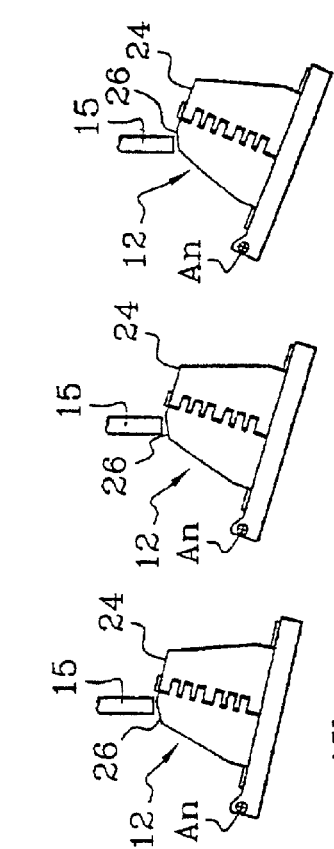
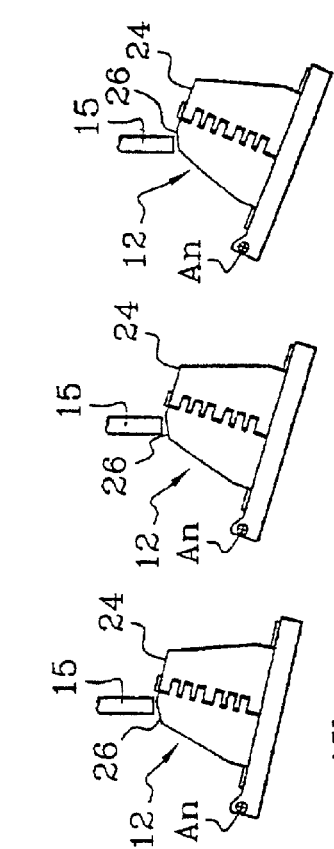
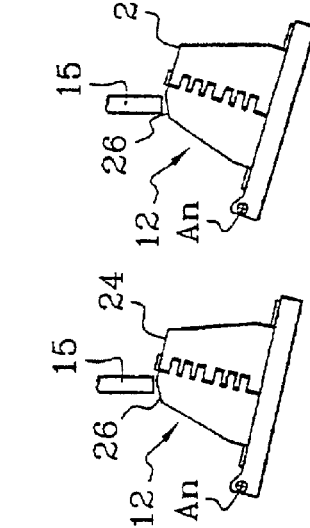
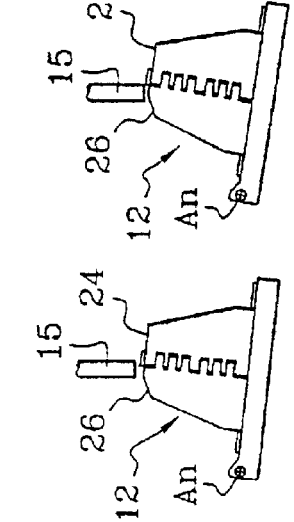
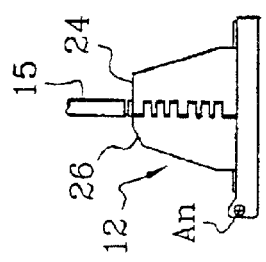
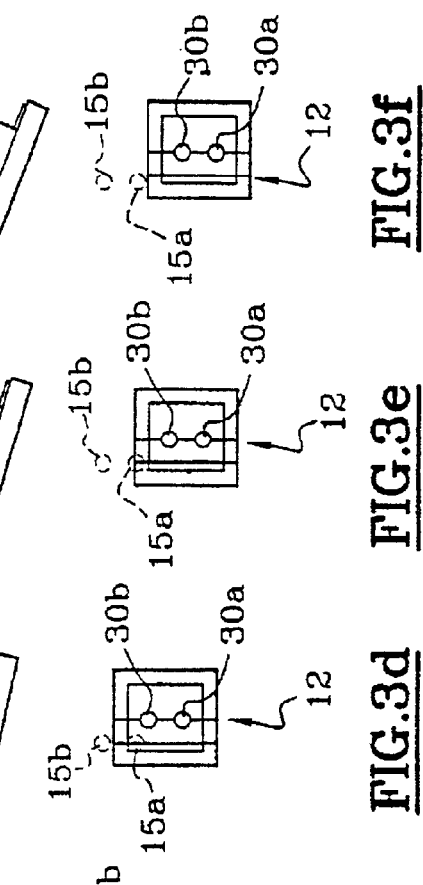
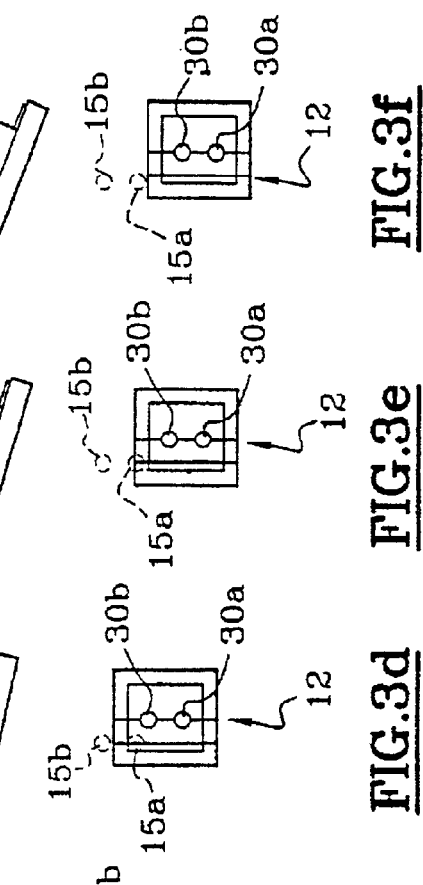
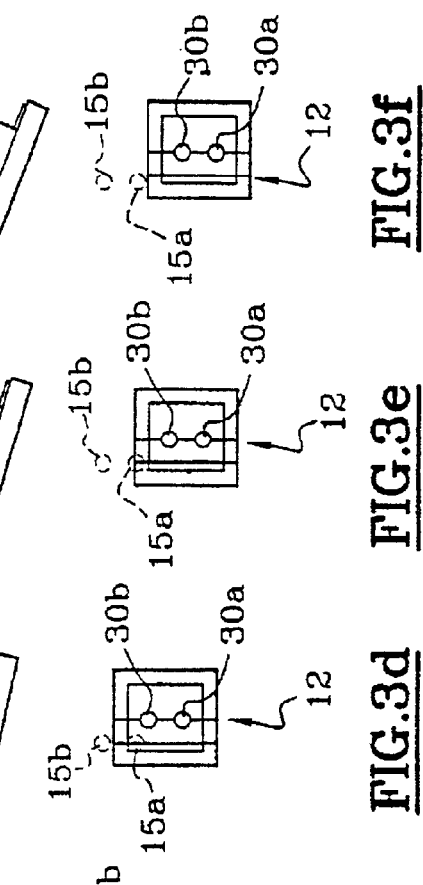
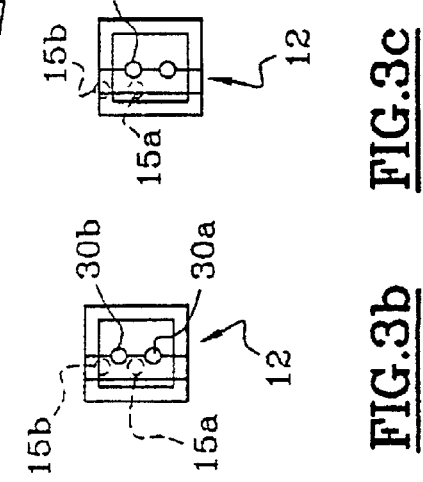
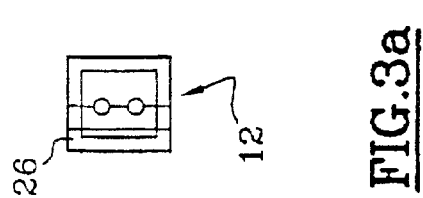

ROTARY EXTRUSION-BLOW MOULDING MACHINE WITH TILTING MOULDS

BACKGROUND OF THE INVENTION

The invention concerns a rotary extrusion/blow-molding machine.

More particularly, it concerns machines provided with several molding units carried by a carrousel that is rotatable around an appreciably vertical axis. In a known way, each molding unit has a two-part mold, both parts being movable with respect to each other between an open position and a closed position.

These machines also have an extrusion head that is placed above the carrousel in a specific angular position around the carrousel's axis of rotation.

Each mold is controlled to be in the open position when the corresponding unit is located below the extrusion head, and to close again after having seized a section of preform flowing from the extrusion head.

The invention is applicable more particularly in the case of machines in which each molding unit is mounted on the carrousel in a way that is movable between a working position and a retracted position to which it is taken just after the section of preform is seized.

The EP-A-0.284.242 document describes a machine of this type. In this instance it is a sequential type machine in which the rotation of the carrousel is not continuous.

The machine described in this document has molding units that can slide vertically with respect to the carrousel between an upper working position and a lower retracted position. Immediately after a molding unit has seized a section of preform, and until this unit has been released below the extrusion head by rotation of the carrousel, the molding unit is moved toward its retracted position. This makes it possible to prevent the preform from spilling over onto the upper face of the mold during extrusion in a situation in which the preform or preforms are continuously extruded.

The vertical sliding of the molding unit corresponds precisely to the direction of extrusion of the preform. The magnitude of the movement of the molding unit should therefore correspond to at least the length of preform that is extruded during the time the blow-molding unit is immobilized beneath the extrusion head. With this design, a free space must therefore necessary be provided beneath the working level of the molding units, to allow their retraction. This free space therefore significantly increases the total height of the machine.

Moreover, the slidable mounting of the molding units is particularly difficult to accomplish satisfactorily. Excellent guidance must be provided to ensure that the unit is perfectly stable, while still allowing relatively fast movement at the time the unit is released.

SUMMARY OF THE INVENTION

A purpose of the invention, therefore, is to propose an improved design of a machine of the type described above, this design allowing machines to be produced that have a high rate of production.

To that end, the invention proposes a machine of the type described above, characterized in that the molding unit is mounted on the carrousel in order to be able to tilt around an appreciably horizontal axis.

According to other characteristics of the invention:

the molding unit is articulated around an axis that is appreciably tangent to the path of the carrousel;

the axis of articulation is vertically off center with respect to the top of the molding unit in the working position so that, at the beginning of the tilting movement, the movement of the top of the molding unit has a horizontal component;

the part of the molding unit over which the extrusion head passes during the tilting movement has a chamfered shape;

the molding unit is mounted on a cradle that is articulated on the carrousel by an inner radial side with respect to the axis of rotation of the carrousel;

both parts of the molding unit are movable with respect to each other in a direction that is appreciably radial with respect to the axis of rotation of the carrousel;

the mold has at least two cavities that are offset along a direction tangential to the path of the carrousel, and the extrusion head (16) has as many dies as the mold has cavities in order simultaneously to furnish that many parallel preforms (15*a*, 15*b*) the separation of which corresponds appreciably to the offset of the cavities (30*a*, 30*b*);

the tilting of the molding unit from its working position to its tilted position is forced by drive means; and the rotation of the carrousel around its axis is continuous.

BRIEF DESCRIPTION OF THE DRAWINGS

Other characteristics and advantages of the invention will appear from the following detailed description, as well as from the attached drawings in which:

FIGS. 2A to 2F and 3A to 3F are drawings illustrating by diagram the relative positions of a molding unit and of preforms extruded by the extrusion head at different moments following the seizing of the sections of preform and the closing of the molding unit, each position being illustrated in side view (2A to 2F) and top view (3A to 3F).

DETAILED DESCRIPTION OF ILLUSTRATIVE, NON-LIMITING EMBODIMENTS

Figure 1:
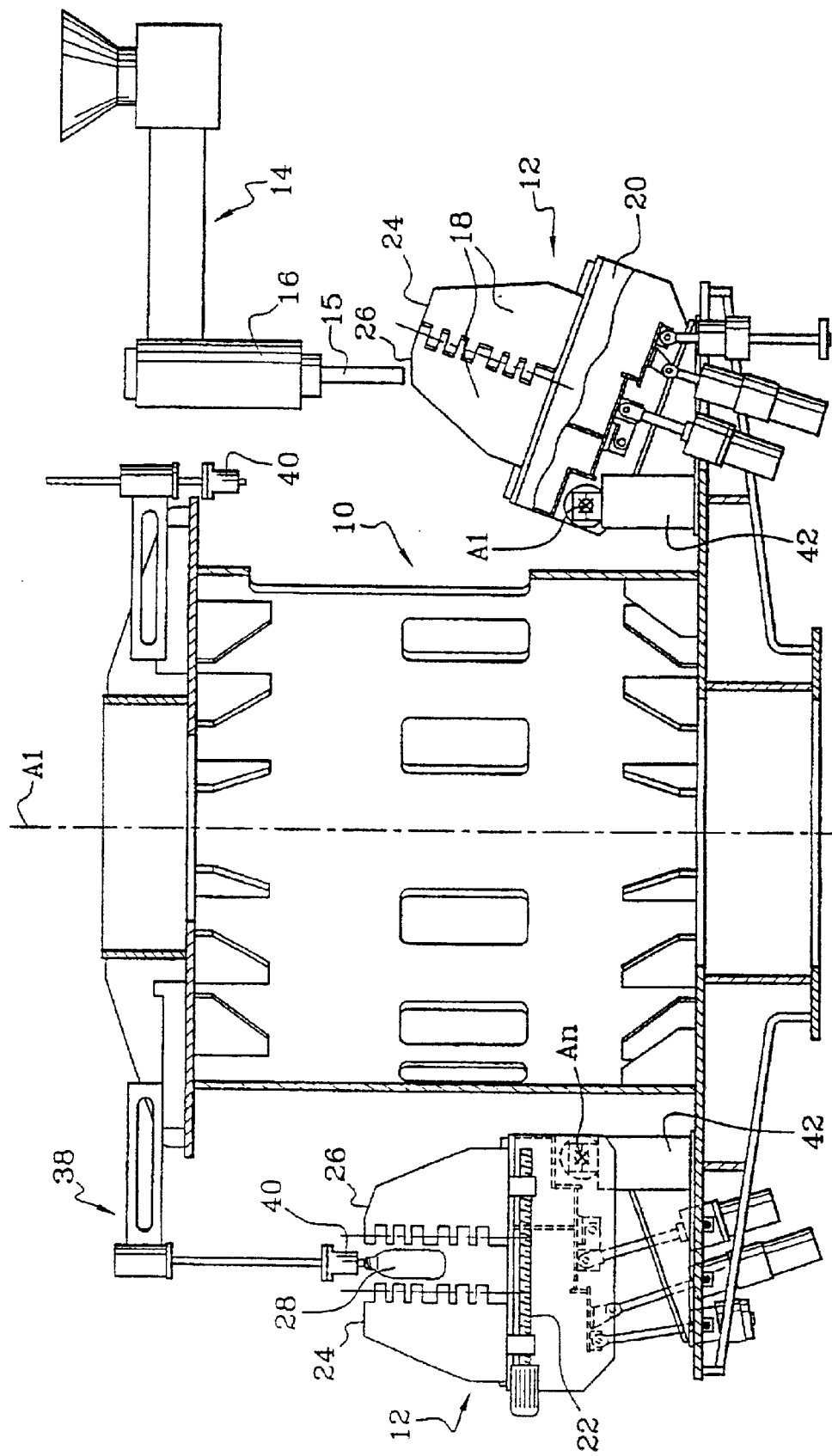
FIG. 1 is a diagrammatical view in axial cross section of a machine according to the invention.

FIG. 1 represents the carrousel 10 of a machine for the extrusion/blow-molding of containers from thermoplastic material. For example, such a machine can be used to manufacture polyethylene bottles.

The carrousel 10 is movable in rotation around its axis A1 with respect to a fixed frame (not represented) of the machine. It carries a series of identical molding units 12 installed around its periphery.

The machine also has an extrusion unit 14 that ends in an extrusion head 16 in which a die delivers one or more continuous tubular preforms 15 of thermoplastic material that is still soft. In the example illustrated, the extrusion head 16 delivers two parallel preforms 15*a* and 15*b* that flow vertically downward. In the machine according to the invention, the extrusion of the preforms is done continuously, that is, the speed of flow of the preforms is appreciably constant.

The extrusion head occupies a fixed position in the space in such a way that, due to the rotation of the carrousel 10, each molding unit 12 passes in turn under the extrusion head 16.

Indeed, in a known way each molding unit 12 has a two-part mold, each mold part being carried by a support 18. The two supports 18 are movable with respect to each other in a direction that, in the situation illustrated, is appreciably radial with respect to the axis A1 of rotation of the carrousel 10.

As can be seen in the left portion of FIG. 1, in which a molding station 12 is illustrated open to allow the ejection of a container 28, the two supports 18 are mounted on a cradle 20 of the station 12 so as to be able to slide in radially, but in opposite directions. The opening and closing movement of the supports 18 is controlled by a screw and nut system 22. This system is designed to cause the simultaneous movement in opposite directions of the two supports 18 with respect to the cradle 20.

Thus, when the mold is opened and the molding unit 12 concerned passes beneath the extrusion head 16, the mold can seize a section of preform 15 that hangs below the head 16 and close again on the lower end of the preform. In this instance, the mold seizes a section of each of the two preforms 15a and 15b, each of these two sections being received into a different cavity 30a, 30b of the mold and the cavities 30a, 30b being in the shape of the container 28 to be manufactured. Generally, a cutting device (not represented) is provided in order to easily separate the section of preform that has just been seized by the mold from the rest of the preform 15, which continues to be formed.

According to the invention, in order to prevent this preform that continues to be formed from coming into contact with the upper face 24 of the molding unit 12, each molding unit 12 is mounted on the carrousel 10 in such a way as to be able to tilt around a horizontal axis An between a working position and a retracted position.

The tilting axis An of each molding unit 12 is preferably appreciably perpendicular to the radial plane of symmetry of the unit 12 in consideration, said plane containing the axis A1 of the carrousel 10.

In the working position, the cradle 20 that carries the supports 18 is horizontal so that the supports 18 can slide horizontally for the opening and closing of the mold. The result is that, when the molding unit 12 is in the working position, the general plane of the faces in contact of the two parts of the mold, or the joint plane, is appreciably vertical and perpendicular to a radius of the axis A1.

Preferably, the cradle 20 is articulated on the carrousel 10 by the side that is situated toward the interior. Thus, the axis An is radially offset toward the interior and vertically downward with respect to the upper face of the molding unit. In this way, when the molding unit 12 tilts downward around the axis An of its working position to its retracted position, it can be seen that the upper face 24 of the molding unit 12 follows a path that, at least at the beginning of the movement, has a vertical as well as a horizontal component.

In order to avoid the preform 15 that is descending from the extrusion head 16, the upper face 24 of the molding unit 12 retracts downward and radially outward.

Moreover, it can be seen that the molding unit 12 does not have a symmetrical shape with respect to the joint plane of the mold. Indeed, the support 18, which is placed so that it is radially toward the interior and the extrusion head 16 therefore passes over it when the molding unit 12 tips, has a bevel 26 that gives the top of the unit a chamfered shape. Of course, this chamfered shape could also be achieved by a curved surface.

Represented in FIGS. 2A to 2F and 3A to 3F are different successive relative positions of the preforms 15 and of the molding unit 12.

FIGS. 2A and 3A illustrate a theoretical position in which the cavities of the mold are each vertically aligned with the respective preform 15; the molding unit 12 is closed again and in the working position; and the sections of preform held inside the mold, which extend slightly above the upper face 24 of the molding unit, have just been separated from the preforms 15 in process of formation by appropriate cutting tools.

This relative position of the different elements corresponds to an ideal situation and can only be precisely found in a sequential machine in which the carrousel is stopped periodically when a molding unit is located precisely under the extrusion head in order to seize the preform. In the case of a machine in continuous rotation, of the type envisaged by the applicant, slight offsets could be encountered with respect to this ideal situation to optimize the operation of the machine. Thus the cutting of the preforms could be done slightly before the complete closing of the mold, the cut therefore occurring offset with respect to the exact moment the cavities pass directly below the preforms.

Starting at that instant, different movements influence the relative position of the molding unit 12 and the preforms 15a, 15b. Thus, the extrusion head 16 from which the preforms flow is fixed, but the length of the preforms 15a, 15b increases linearly as a function of time. The molding unit 12 is driven in continuous rotational movement around the axis A1 of the carrousel, and according to the invention, it is driven in a tilting movement around the axis An by pivoting its cradle 20.

FIGS. 2B, 3B, 2C and 3C clearly show the advantage of the horizontal clearance caused by the circular tilting movement of the molding unit. To be sure, in the absence of this horizontal movement the preform 15a that has just been fed into the front cavity 30a of the mold (considering the circular path of the mold around the axis A1) would pass directly over the rear cavity 30b. Inside this cavity is a section of preform the upper end of which protrudes above the upper face of the molding unit. Also, to prevent any contact between the preform 15a and this protuberance, the molding unit must be made to withdraw very quickly downward.

However, the beginning of the tilting movement of the molding unit is necessarily at a relatively slow speed. Indeed, because of the mass of the molding unit to be put in motion, it cannot be made to accelerate very quickly.

Also, it can be seen in FIG. 3C that, as a result of the horizontal component of the tilting movement, the preform 15a does not pass above the rear cavity 30b.

FIGS. 2D, 3D, 2E, 3E show the importance of the chamfered shape of the top of the molding unit. It can be seen that, if there were no bevel 26, that is, if the two supports 18 were completely symmetrical, the preforms would risk coming into contact with the support 18 that is situated radially inside. The presence of the bevel 26 thus makes it possible to limit the magnitude of tilting of the molding unit, and thus to limit the speed of tilting.

In the example illustrated, the tilting movement of the molding unit 12 is controlled, in both directions, by an actuating cylinder. Obviously, however, any type of actuator can be used. In addition, a damper is provided to dampen the tilting movement at the limit of travel both in the retracted position (illustrated in FIGS. 2F and 3F) as well as when it returns to the working position. Moreover, the molding unit is held in the working position by a controlled lock coupled with a mechanical stop.

As soon as a molding unit 12 has crossed the angular sector where the extrusion head 16 is located, it is moved to its working position for the blow-molding operation.

According to one preferred form of embodiment, the blow-molding operation is performed with blow pins that are moved vertically downward to penetrate at least partially inside the upper end of each of the sections of preform held in the mold. The use of blow pins rather than blow needles placed in the mold makes it possible to produce containers that have a perfect sized neck.

Because of this, the blow-molding of the containers should be done with the molding unit in a position such that the mold's cavities are oriented vertically.

Of course, the machine has as many blow-molding units 38 as molding units 12, and each of the blow-molding units 38 has two blow pins 40. An upper plate of the carrousel carries the blow-molding units 38, and it can be seen that they are radially movable with respect to the carrousel between an outer radial position, in which the pins 40 are directly over the cavities of the respective molding unit, and a position retracted radially toward the interior. As can be seen in the right part of FIG. 1, the blow pins must be radially retracted toward the interior when they pass into the angular sector in which the extrusion unit 14 is located. Otherwise, the pins 40 would collide with the extrusion head 16.

According to another feature of the machine according to the invention, each molding unit 12 is not articulated directly on the carrousel 10, but on a base 42 that is attached (removable) to the carrousel 10. The actuating cylinder, the damper and the lock are also mounted on the base 42 so that in the event of failure of a molding unit 12, the unit can be removed very quickly simply by detaching the base from the carrousel 10. This makes it possible to limit the down time of the machine, which can continue to manufacture containers even with one less molding unit. It is even possible to provide a standby blow-molding unit to immediately replace the defective unit at least for the time required to repair it.

The provision of tilting molding units is particularly beneficial because of the very small increase in height that this involves for the machine. In addition, a pivot connection can easily be made between the cradle 20 and the base 42, which is particularly rigid, to ensure the perfect positioning of the molding unit 12 with respect to the blow-molding units 38 and the extrusion head 16.

Thus, the machine according to the invention makes it possible to expect high operating speeds while still being perfectly reliable.

What is claimed is:

1. An extrusion, blow-molding machine comprising:
   a plurality of molding units carried by a carrousel which is rotatable around a substantially vertical axis (A1), the molding units including a two-part mold, both parts being movable with respect to each other between an open position and a closed position;
   an extrusion head which is placed above the carrousel in a specific angular position around the carrousel's axis of rotation (A1), the molding units being controllable to be in an open position when the molding units are respectively located below the extrusion head, and to be in a closed position after having seized a section of a preform flowed from the extrusion head,
   wherein the molding units are mounted on the carrousel such that they are respectively movable between a working position and a retracted position, the retracted position being taken just after a section of preform is seized, and the molding units being mounted on the carrousel so as to be able to tilt around a substantially horizontal axis of articulation (An), and
   wherein the molding units are respectively articulated around an axis (An) which is substantially tangent to a path of the carrousel.

2. The machine according to claim 1, wherein the axis of articulation (An) is vertically off center with respect to a top of the respective molding units in the working position so that, at the beginning of the tilting movement, the movement of the top of the molding units has a horizontal component.

3. The machine according to claim 2, wherein a part of the respective molding units over which the extrusion head passes during the tilting movement has a chamfered shape.

4. The machine according to claim 1, wherein the molding units are respectively mounted on a cradle which is articulated on the carrousel by an inner radial side with respect to the axis of rotation (A1) of the carrousel.

5. The machine according to claim 1, wherein both parts of the molding units are movable with respect to each other in a direction that is appreciably radial with respect to the axis of rotation (A1) of the carrousel.

6. The machine according to claim 1, wherein the molding units respectively have at least two cavities which are offset along a direction tangential to the path of the carrousel, and wherein the extrusion head has as many dies as the molding units have cavities in order to furnish simultaneously parallel preforms, the separation of which corresponds appreciably to the offset of the cavities.

7. The machine according to claim 1, wherein the tilting of the molding units from their working positions to their tilted positions is forced by drive means.

8. The machine according to claim 1, wherein the rotation of the carrousel around its axis (A1) is continuous.

9. The machine according to claim 1, wherein the molding units are configured such that they are positioned in the retracted position after the section of the preform has been severed from a remaining amount of preform in the extrusion head.

* * * * *